March 11, 1924.   1,486,307
C. G. SEEFLUTH ET AL
FLYTRAP
Filed March 1, 1923   2 Sheets-Sheet 2
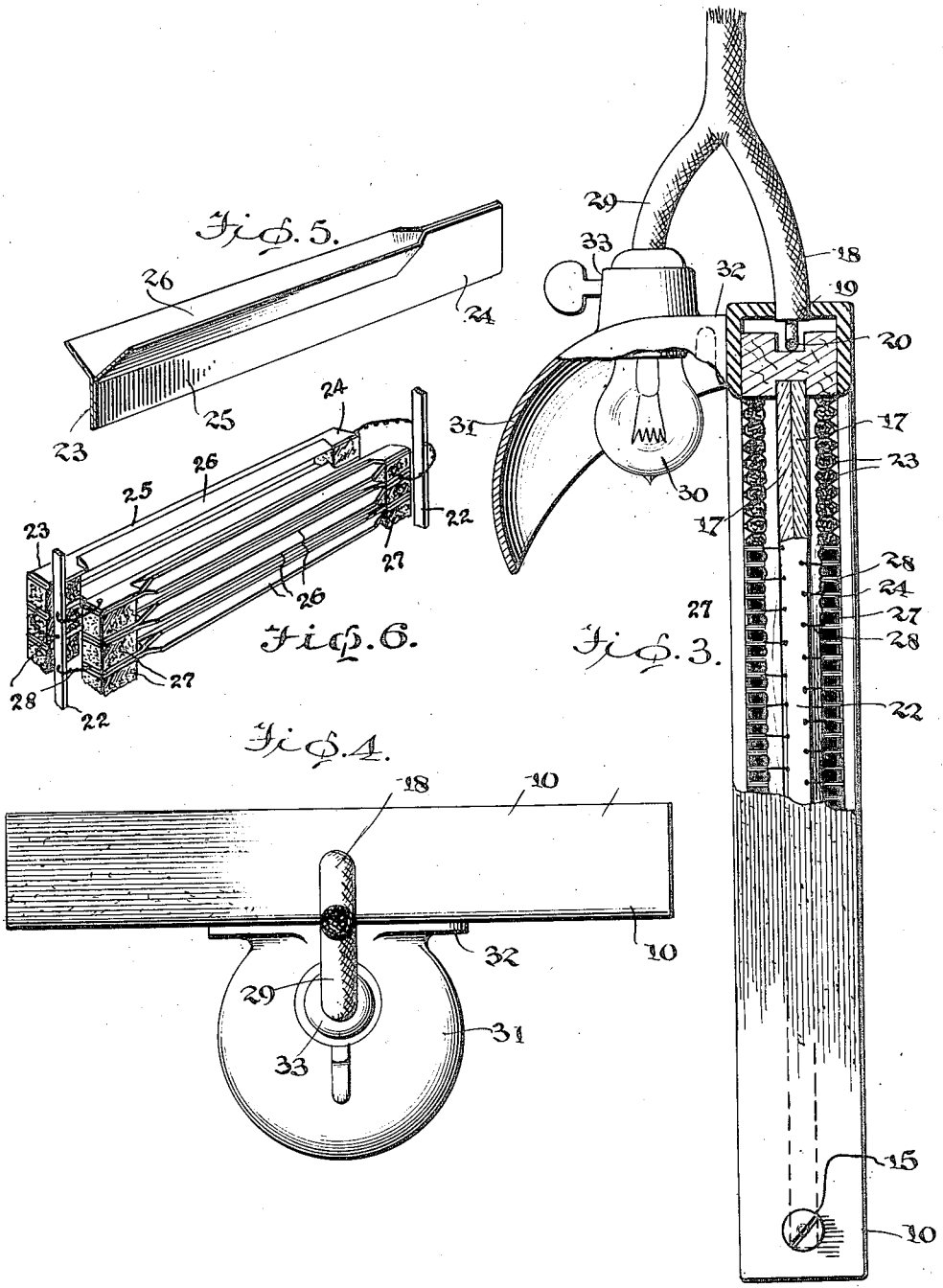

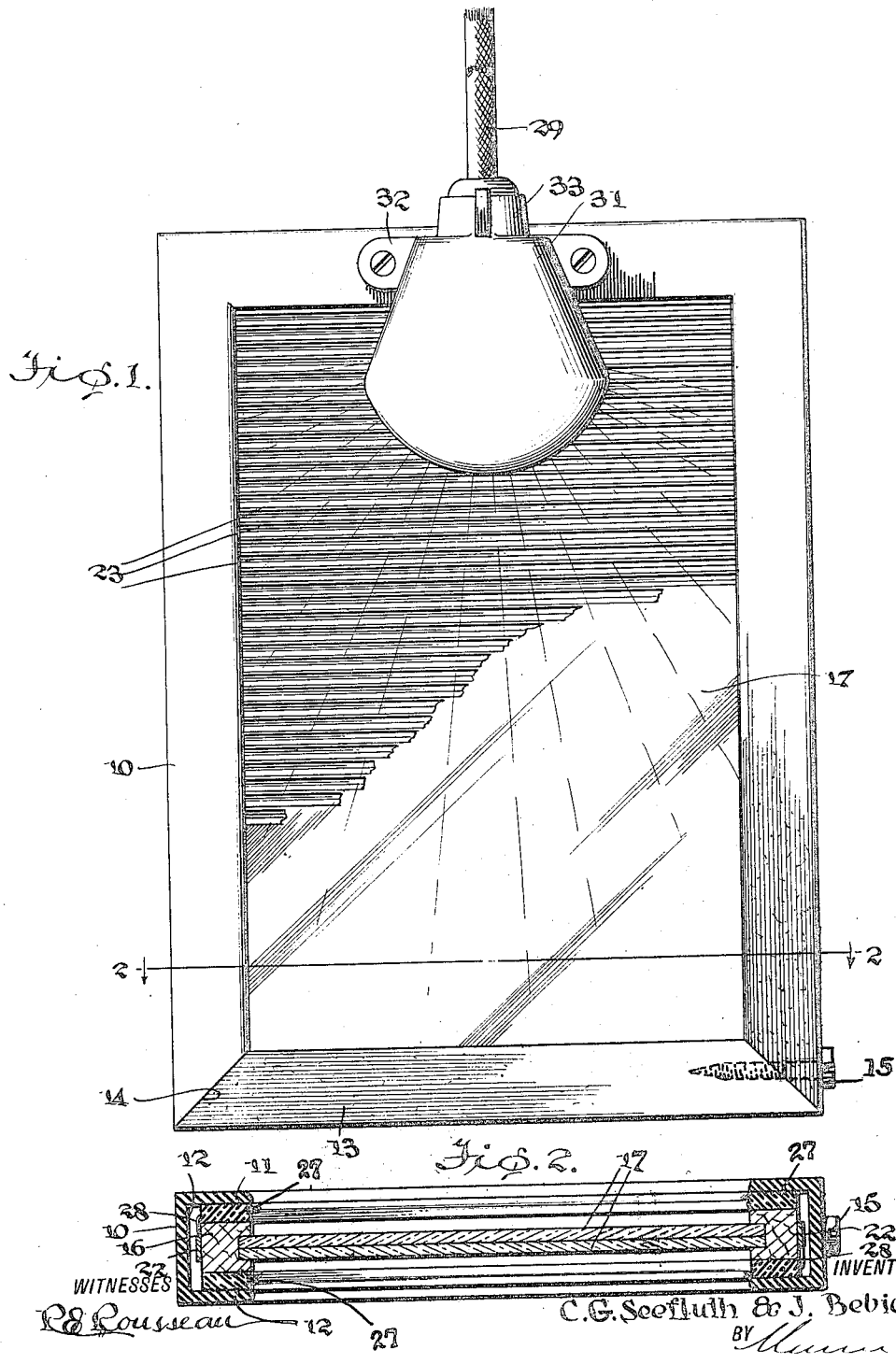

Patented Mar. 11, 1924.

1,486,307

UNITED STATES PATENT OFFICE.

CHARLES G. SEEFLUTH AND JOHN BEBIOLKA, OF PONTIAC, MICHIGAN; SAID BEBIOLKA ASSIGNOR TO SAID SEEFLUTH.

FLYTRAP.

Application filed March 1, 1923. Serial No. 622,116.

*To all whom it may concern:*

Be it known that we, CHARLES G. SEE-FLUTH and JOHN BEBIOLKA, citizens of the United States, and residents of Pontiac, in the county of Oakland and State of Michigan, have invented certain new and useful Improvements in Flytraps, of which the following is a specification.

This invention relates to an electric fly and insect destroyer or exterminator in the form of a trap of simple and novel construction and more particularly to an electrically energized contact bar exterminator, the object of which is to provide a trap for destroying flies and other obnoxious insects which when the insects come into contact with the active elements thereof will electrocute them and thus exterminate the same in a sanitary and efficient manner, thereby obviating the necessity of employing catching means which mutilate or similarly injure the flies, or of providing sticky fly paper or poisonous materials which are unsanitary and dangerous to use, especially in the presence of children.

A further object of the invention is to provide an improved fly trap or exterminator which embodies a novel construction and arrangement of contact bars or active elements associated in a frame of insulating material so as to render the same shock proof and perfectly safe, while permitting assemblage or disassemblage of the trap with ease and convenience, and also providing novel means for attracting the flies or other insects to the trap for the purpose of destroying the same in large numbers, the device in addition being simple and inexpensive in construction and unlikely to get out of order so as to last with proper care, almost indefinitely.

Other and further objects of our invention will become readily apparent to persons skilled in the art from a consideration of the following description when taken in conjunction with the accompanying drawings, wherein Figure 1 is a front elevation of the improved electric fly and insect destroyer.

Figure 2 is a transverse horizontal sectional view taken on the line 2—2 of Fig. 1, and looking in the direction indicated by the arrows.

Figure 3 is a view mainly in side elevation of the device shown in Fig. 1, portions thereof being broken away and other portions being shown in section.

Figure 4 is a top plan view of the device,

Figure 5 is a relatively enlarged perspective view of one of the contact members comprised in the device, and Figure 6 is a fragmentary perspective view showing a plurality of the contact members and illustrating the manner of insulatingly spacing adjacent contact members apart at their ends and the manner of electrically connecting the contact members to bus bars.

Referring to the drawings in detail in which for purposes of illustration is shown the preferred embodiment of the invention and in which like reference characters designate corresponding parts throughout the several views, the improved electric fly and insect destroyer is shown as embodying an open outer frame or case 10 of rectangular or other geometrical outline comprising members channel or U-shaped in cross sectional contour to provide by reason of the sides or side flanges 11 an internal groove or seat 12. The top and sides of the frame are preferably integral, being cast of rubber or other insulating material, and a removable bottom portion 13 fitted to the ends of the sides to provide miter joints as indicated at 14. The bottom 13 is secured in position at the lower end or bottom portion of the frame by a suitable fastening means, such as the screw 15, in order that the bottom portion may be removed, if desired, or held in position to complete the frame. The shape of the removable part will depend upon the geometrical outline of the frame.

Removably held in the seat or groove 12 of the outer frame and insertible or removable when the bottom portion thereof has been removed, is an inner frame 16, preferably of wood and constituting means adapted to retain therein suitable luring or attracting plates or mirrors 17, the frame 16 being rabbeted or grooved internally to receive edge portions of the mirrors therein and retaining the mirrors in position, it being understood that the frame 16 may be of one or two or more parts, as desired, or may constitute separate side portions secured together to retain the mirrors therein. The mirrors 17 are disposed back to back, and the reflectors produced thereby constitute means for attracting flies or other insects to the destroyer or trap for the purpose of killing and exterminating the same in a manner to be hereinafter more fully described. The trap is alike on both sides, in this respect, being double faced and therefore double acting when hung up or suspended in the usual manner.

It will also be obvious that by arranging the mirrors back to back in the manner described the provision of a hollow interior space to catch foreign matter, dirt or insects will be avoided. An insulated electrical conductor 18 extends through the opening 19 in the top of the case or frame 10 and branches to provide conductors 20 extending in opposite directions along the top of the inner frame 16 to the sides of the latter and being there connected to the bus or distributor conducting bars 22 which are in the form of copper strips secured to the opposite sides of the inner frame within the channel or groove 12 of the outer frame and thus protected from contact with persons handling the device, thereby preventing the persons grasping various contacts to be described. The contacts 22 are secured in position to extend longitudinally of the sides of the inner frame.

A plurality of contact members 23 made of an electrical conducting material such as copper, and having the form of bars having flat end portions 24 and a Y-shaped intermediate portion 25 are provided. A pocket 26 is thus provided between the divergent arms of the Y-shaped portion of each member 23 and in this pocket may be placed a suitable bait which is sufficiently adhesive to cling to the walls thereof when the members 23 are horizontally disposed, as will presently appear. The members 23 are arranged in spaced parallel relation to extend transversely of the inner frame 16 adjacent or contiguous to the reflecting faces of the mirrors 17, being spaced apart at their ends by blocks 27 of insulating material as best seen in Figures 3 and 6. Adjacent spacing blocks 27 may be secured to the interposed end portions of the members 23 and to each other by a suitable adhesive substance and the blocks 27 may also serve to hold the inner frame 16 centered in respect to the flanges of the outer frame 10. Alternate members 23 are connected at their corresponding or similar ends to the same bus or distributor bar 22 by wires 28 or like conducting means whereby adjacent members 23 will be connected to the bars 22 at opposite sides of the inner frame and will thus be positive and negative, electrically considered. The arrangement of the members 23 is such that the divergent arms of the Y-shaped portions 5 are outermost and adjacent members are spaced apart so that a fly alighting or walking upon the outer edges of the members 23 will span adjacent arms of the Y-shaped portions of adjacent members 23, thus closing a circuit and resulting in the electrocution of the fly or other insect. The members 23 adjacent or contiguous to each mirror 17 thus comprise an electric grid. The circuit is normally open, and is shorted through the insects when touching adjacent members 23 so as to bridge the same, as it is thought will be readily understood.

The current conducting wire 18 forming a lead for the device is preferably provided with a socket or switch plug (not shown) such as is commonly used in house wiring or lighting systems so as to carry from 110 to 120 volts and branching from the conductor 18 exteriorly of the outer frame is a branch conductor 29 connected with an electric lamp or incandescent bulb 30 removably mounted in a socket carried by a reflector 31 secured through the medium of its base portion 32 to the frame 10, preferably at the top thereof. The wire 29 is provided with an interposed or inserted switch 33 for independently controlling the lighting or illuminating means thus provided, it being obvious that one or more of the lamps may be provided at each or either side of the frame 10 as desired. The reflectors 29 are preferably curved outwardly and downwardly so as to throw or reflect the light rays against the mirrors or reflectors 17 and to thus aid in luring insects to the trap. Thus by reason of the shade or reflector provided for each lamp in conjunction with the mirrors, the flies and other insects will be attracted, in the night time as well as in the day time. It will also be apparent that both the charged wires or active elements and the lamps may be independently or simultaneously controlled or employed, the lead 18 being adapted for connection through the medium of a suitable plug (not shown) with a socket of a lighting fixture in the room in which the device is installed or in use. Obviously, the members 23 may be of metal or other conducting material having a bright surface, and by reason of the fact that the common house fly is readily attracted to anything of this character, avoiding dark and dull objects, it will be readily seen that when the lamps are not ignited, the device will be found to be most effective when placed near a window where the light force is greatest. The members 23 are sufficiently stiff and strong to retain their form after continued service.

The inner frame is so constructed that the mirrors may be inserted through a slot in the bottom thereof or at its lower end, said slot being closed by the bottom panel so as to retain the mirrors in place, while the entire inner frame and the mirrors mounted therein are retained against displacement from the outer frame by the bottom portion 13 of the outside frame.

It will also appear that the device will electrocute and kill or destroy all and any flies or insects that may come in contact with it or fly upon it. The device is also shock proof and therefore perfectly safe to handle, in addition, it is the most sanitary method for the purpose intended, obviating the necessity of employing sticky fly paper, poisonous powders or the like which are unsanitary and dangerous. The device consumes no current until contact is made by a fly or insect, which consumption is then so minute that it does not affect the electric meter to any appreciable extent, thereby making the device inexpensive of use.

In view of the foregoing, it is thought that the operation of the device will be readily apparent and in view of the simplicity and practical value thereof that it will readily commend itself to those skilled in the art.

Having thus described our invention what we claim is:—

1. An insect destroyer or killer of the class described comprising an outer open frame of insulating material, an inner frame removably mounted therein, leads extending through the outer frame and having distributors disposed along opposite sides of the inner frame, parallel contact members extending transversely of the inner frame in spaced relation thereto, insulating members disposed between the contact members and holding adjacent contact members in close proximity to each other although out of contact with each other, and conductors connecting the contact members to the distributors alternately.

2. An insect destroyer or killer of the class described comprising an outer grooved or channeled frame of insulating material, an inner frame removably mounted therein, one side of the outer frame being removably secured in position, opposed mirrors mounted in the inner frame removably, leads extending through one side of the frame and having distributors disposed along opposite sides of the inner frame, spaced parallel conductors extending from the opposed distributors adjacent to the faces of the mirrors, insulating members spacing the conductors apart at their ends, and conducting means conecting alternate conductors to the same distributor.

3. An insect destroyer or killer of the class described comprising an outer grooved or channeled frame of insulating material, an inner frame removably mounted therein, one side of the outer frame being removably secured in position, opposed mirrors mounted in the inner frame removably, leads extending through one side of the outer frame and having distributors disposed along opposite sides of the inner frame, spaced parallel conductors extending from the opposed distributors, and adjacent to the faces of said mirrors to provide a grid, a reflector mounted upon the side of the frame, a lamp therein connected with the lead, the light rays thereof being reflected upon the grid and mirrors, and means for allowing and preventing the flow of current through said lamp independently of the current flowing through the grid.

4. An electric fly and insect trap or destroyer of the class described comprising a channeled outer frame of insulating material, an inner frame of wood or other insulating material removably held therein and provided with a central groove in its inner walls, luring panels mounted in said groove, metal bars insulatingly supported in spaced parallel relation adjacent to the opposite faces of the inner frame, conducting distributors along the outer sides of the inner frame, conducting means connecting each distributor to alternate metal bars, and lead wires connected to said distributors.

5. An electric fly and insect trap or destroyer of the class described comprising a channeled outer frame of insulating material an inner frame of wood or other insulating material removably held therein and provided with a central groove in its inner walls, luring panels mounted in said groove, metal bars insulatingly supported in spaced parallel relation adjacent to the opposite faces of the inner frame, said metal bars having the intermediate portions thereof substantially Y-shaped in cross section and being disposed with the divergent arms thereof outermost to provide pockets adapted to receive bait, conducting distributors along the outer sides of the inner frame, conducting means connecting each distributor to alternate metal bars, and lead wires connected to said distributors.

CHARLES G. SEEFLUTH.
JOHN BEBIOLKA.